Figures 5, 6:
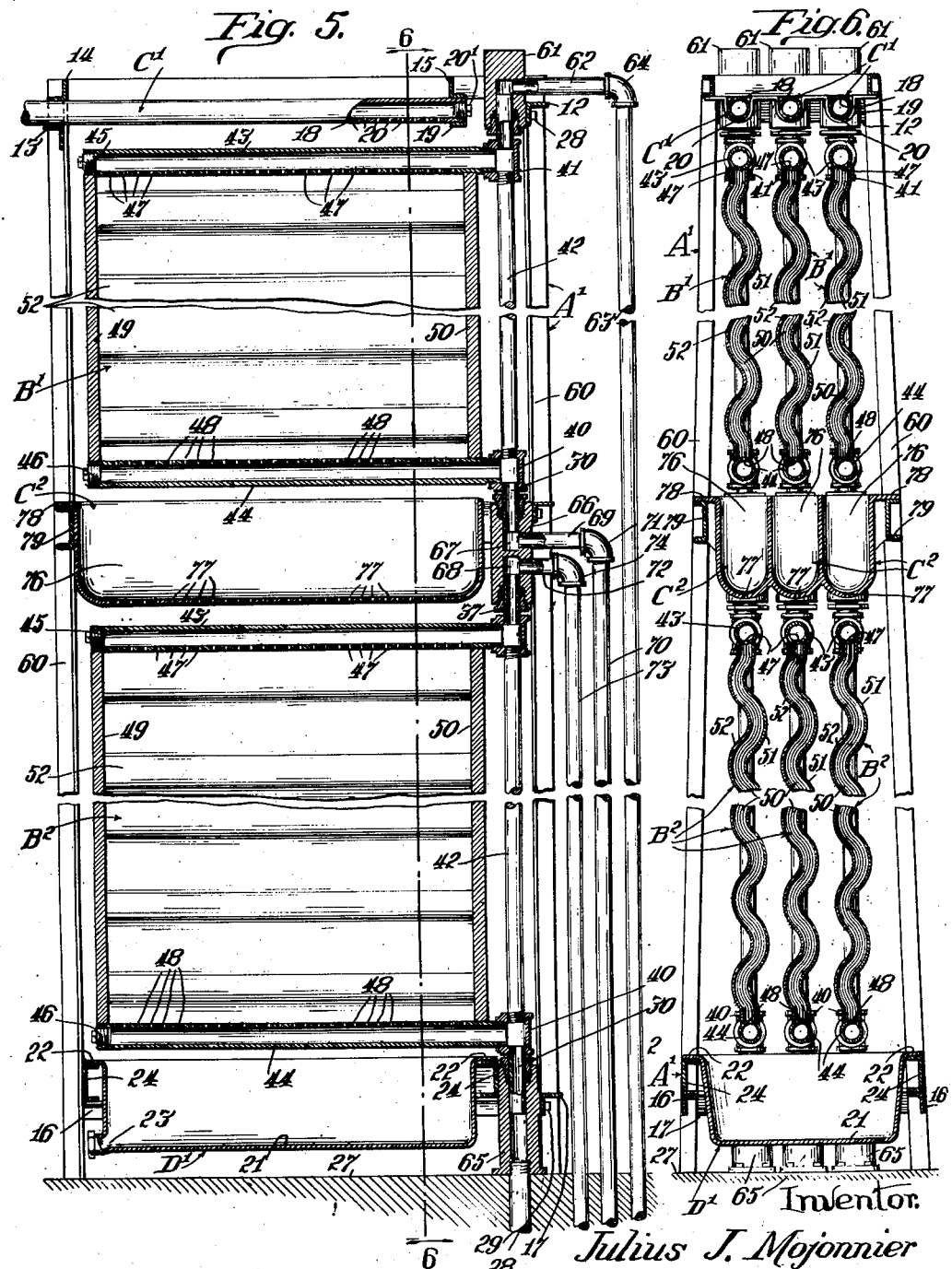

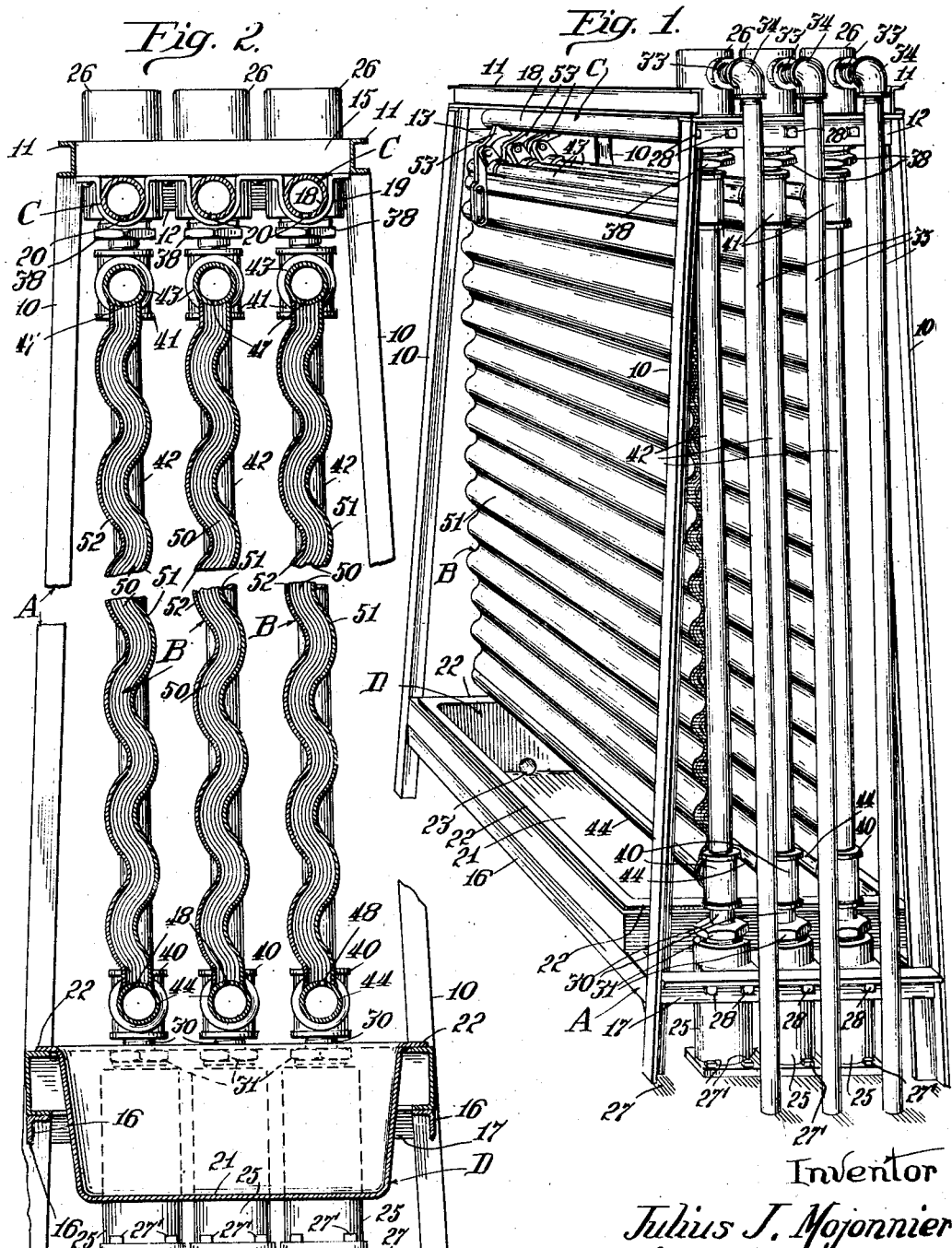

Aug. 8, 1939.     J. J. MOJONNIER     2,169,054
LIQUID TREATING APPARATUS
Filed Jan. 2, 1931     3 Sheets-Sheet 2
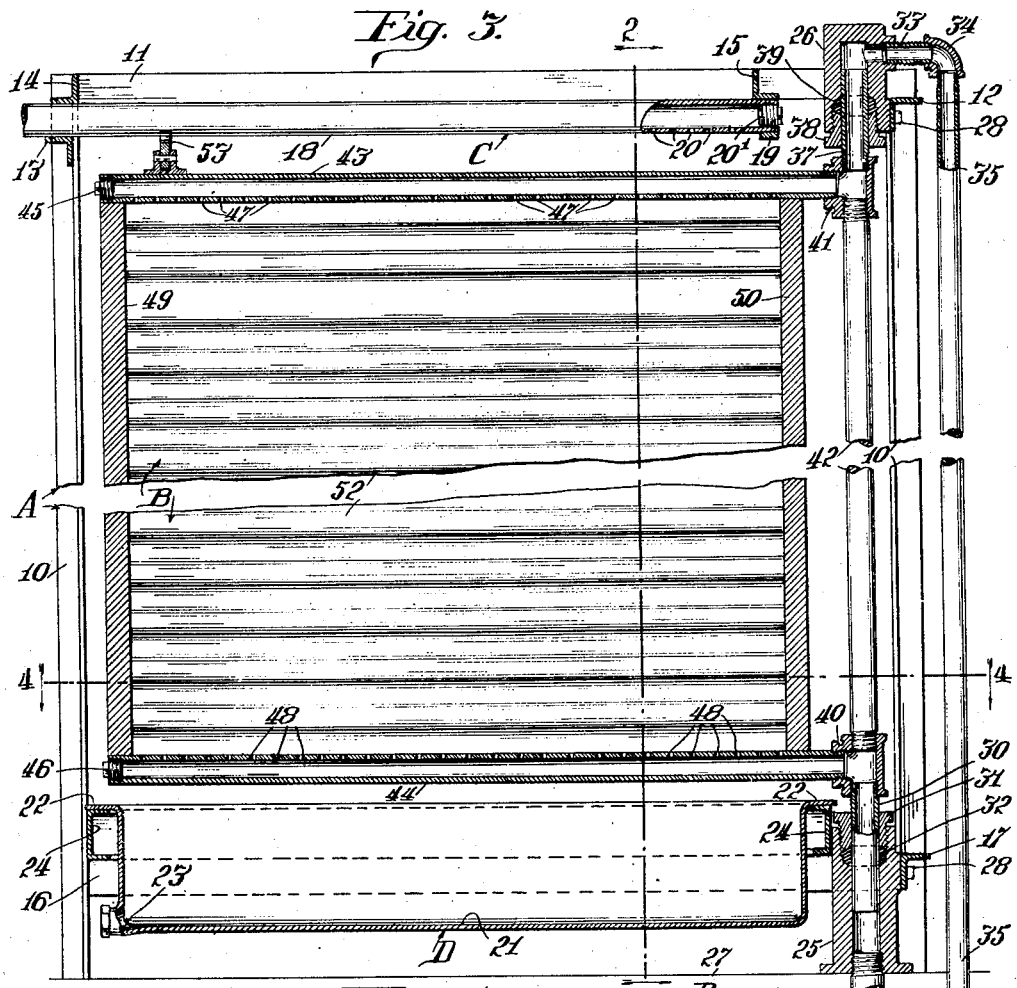
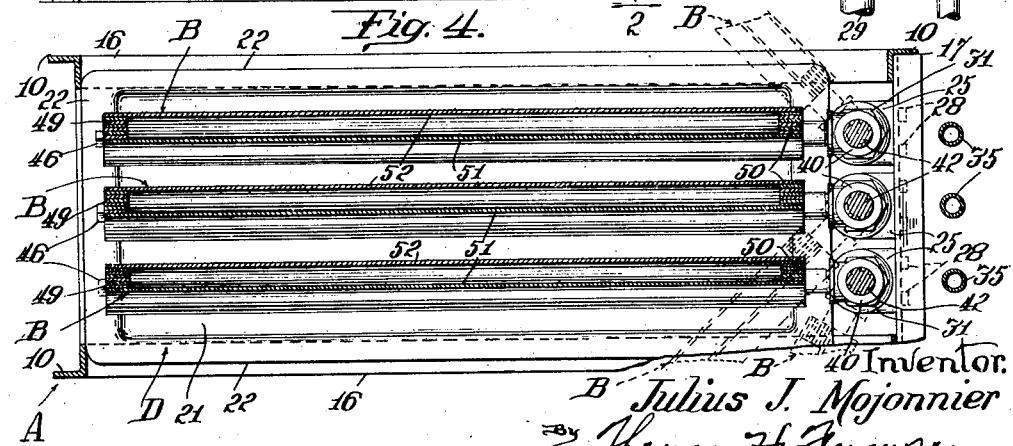
Inventor.
Julius J. Mojonnier
By Thomas H. Ferguson
Attorney.

Aug. 8, 1939.  J. J. MOJONNIER  2,169,054
LIQUID TREATING APPARATUS
Filed Jan. 2, 1931   3 Sheets-Sheet 3

Inventor.
Julius J. Mojonnier
by Thomas H. Ferguson
Attorney.

Patented Aug. 8, 1939

2,169,054

UNITED STATES PATENT OFFICE 2,169,054

LIQUID TREATING APPARATUS

Julius J Mojonnier, Oak Park, Ill., assignor to Mojonnier Bros. Co., a corporation of Illinois Application January 2, 1931, Serial No. 506,164

13 Claims. (Cl. 257—187)

The present invention relates to liquid treating apparatus of the class wherein a change in temperature is brought about in the treated liquid by passing heat through a metal wall or partition, the heat being either supplied or absorbed by a temperature modifying fluid, depending on the direction of flow of the energy. Where the heat passes from the modifying fluid to the treated liquid, the latter is heated; but where the heat passes from the treated liquid to the modifying fluid, the treated liquid is cooled. In the former case the modifying fluid is a heating fluid and in the latter case the modifying fluid is a cooling fluid. Commonly, in such apparatus a treating unit or section is preferably provided by constructing a box-like structure of small thickness and relatively large length and width, and supplying the heating or cooling medium to the interior while passing the liquid to be treated over its exterior. An illustration of such a device is the common milk cooler.

One object of the invention is to provide a novel apparatus of the type mentioned which shall be efficient in operation and at the same time economical to manufacture and maintain. To this end I employ corrugated metal sheets for the principal surface members of the unit and space them apart preferably with novel end members. The liquid passes downward over these sheet surfaces while it receives or gives off heat, according to the character of the temperature modifying medium passing through the interior of the unit. Suitable inlet and outlet connections are provided for the latter, as well as suitable delivering and collecting means for the liquid being treated.

In order to accelerate the transference of heat, whichever way it is to flow, I preferably cause the temperature regulating fluid to pass upward through the unit while the liquid being treated passes downward over it.

Another feature of my invention resides in the provision made for the ready and efficient cleaning of the several heat transferring units, for in practice it is usual to employ several although, of course, the features may often be used to advantage where there are but a few units, or even only one. This feature consists in the mounting of each unit on an axis extending along one of its edges so that it may be swung into and out of normal operating position. By locating the axes of the units close together, it is possible to group the units compactly for service and then to separate them readily for inspection and cleaning. Preferably, they are mounted so that they may be opened out like the leaves of a book.

Still another feature resides in the arrangement of these units one above another, or one group above another group. With such an installation the liquid under treatment may pass from one kind of treatment, received from the upper units, to another kind of treatment administered by the lower units. Thus, in treating milk, water may be the controlling medium of the upper units and ammonia or brine the controlling medium of the lower units.

These and other features and advantages of my invention will be more fully understood upon consideration of the following detailed description taken in connection with the accompanying drawings, while for the scope of the invention reference should be had to the appended claims.

In said drawings, Fig. 1 is a perspective view of a one-high liquid treating apparatus constructed and arranged in accordance with the present invention; Fig. 2 is a transverse vertical section through the same, the plane of section being indicated by the line 2—2 of Fig. 3; Fig. 3 is a central vertical longitudinal section through one of the units and associated parts, central portions being broken away to reduce the size of the figures; Fig. 4 is a horizontal section through all the units, the plane of section being indicated by the line 4—4 of Fig. 3; Fig. 5 is a central longitudinal vertical section through a modified form of the invention, known as two-high apparatus, wherein two groups of units are arranged vertically one above the other, with intermediate parts broken away to reduce the size of the figure; and Fig. 6 is a transverse vertical section similar to that of Fig. 2 illustrating this modification, the plane of section being indicated by the line 6—6 of Fig. 5. Throughout these views like characters refer to like parts.

Referring to said drawings in detail, A designates the frame work of the one-high apparatus, B the liquid treating units, C the supply connections for the liquid to be treated, and D the trough for catching the treated liquid. In the two-high apparatus, $A^1$ designates the frame work, $B^1$ the upper set of treating units, $B^2$ the lower set of treating units, $C^1$ the supply connection for the liquid to be treated, $C^2$ the intermediate troughs for catching the liquid from the units $B^1$ and delivering the same to the units $B^2$, and $D^1$ the trough for catching the liquid after it has been fully treated.

The frame A includes inclined posts 10, upper frame members 11, 12, 13, 14, 15 and lower frame members 16, 17. The upper frame members 11 are preferably channels running lengthwise of the frame and resting upon and secured to the upper ends of the posts 10. Between these channels extend transverse members 14, 15 which are preferably angle irons. Spaced a short distance from the transverse member 14 is a similar member 13 which is secured to the posts 10 at that end of the structure. The posts 10 at the other end of the structure are secured together at their upper ends by the transverse member 12. Similarly, the lower portion of the frame is suitably connected by longitudinal bars 16 and at one end by the transverse bar 17. These various frame members may be secured together in any desired way. As shown, they are welded together.

The supply connections C consist, preferably, of a series of pipes 18 which extend lengthwise of the frame and are supported at one end between the transverse bars 13, 14, and at the other end by a strip 19 which extends under the pipes 18 and is secured to the under side of the transverse bar 15. These pipes 18 have their lower portions perforated by small openings 20 through which the liquid to be treated is applied to the units B which, when in normal position, lie directly below the pipes 18, one unit being positioned with reference to each pipe. One end of each of the pipes 18 is closed by a plug 20', while the other end is connected to some source of supply of the liquid to be treated.

The trough or basin D is provided with a body 21 having a peripheral flange 22. The bottom of the body 21 is inclined downward toward one end and is there fitted with an outward connection 23 by which the trough may be connected to a pipe through which the treated liquid is to be delivered. The flange 22 rests upon a rectangular frame 24 which is preferably formed of four pieces of channel iron welded together to form the frame. This frame 24 rests at its sides upon the longitudinal members 16. The frame 24 is preferably welded to the longitudinal members 16 and also to the posts 10 at the points where they contact with them. The frame 24 materially strengthens the lower portion of the main frame A. The basin or rough D is made large enough to receive the liquid delivered from the several treating units B which are associated in the complete apparatus.

Each unit B has associated with it a lower bearing block 25 and an upper bearing block 26 which serves as pivot bearings for the unit. The pivot block 25 preferably rests upon the floor or foundation 27 and rises to a height somewhat above the transverse members 17. If desired bolts 27' may be passed through the flanges at the bottoms of the blocks 25 to secure them to the support 27. The several pivot blocks 25 and 26 are secured to their respective transverse members 17 and 12 by suitable bolts 28. Each pivot block 25 is apertured and provided with a connecting pipe 29 which is threaded into the bottom of the block. A similar pipe 30 is journaled to rotate in the same opening in the block 25. A gland 31 having suitable packing 32 serves to form a water-tight connection between the block and the pipe 30 so that the latter may be rotated without 1 akage of the fluid supplied to the unit. In like manner the pivot block 26 is provided with a pipe connection including a nipple 33, an elbow 34, and a pipe 35. The opening in the pivot block 26 is provided with a pipe 37 similar to the pipe 30 and, like it, provided with a gland 38 having suitable packing 39.

The pipes 30 and 37 are connected respectively with T pipe connections 40 and 41. These connections are in turn united by a rod 42. The rod 42 and the pipes 30 and 37 are all located upon a vertical axis which constitutes the axis of rotation of the unit. Thus, these connections provide swiveled hollow hinges for the unit and the associated piping provides conduit connections for the passage of the treating liquid medium through the hinges to and from the interiors of the associated units, as will be clearly apparent.

From the center of the T connection 41 extends a pipe 43 which forms the upper closure of the chamber of the associated treating unit B. In like manner, a pipe 44 extends laterally from the T connection 40 and forms the lower closing member of the chamber of the same treating unit. The pipes 43 and 44 have their outer ends closed by plugs 45 and 46 respectively. Small openings 47 in pipe 43 and similar openings 48 in pipe 44 provide connecting passages between the pipes and the chamber of the unit. The end members 49 and 50 of each unit chamber are connected at their ends to the pipes 43 and 44 in spaced relation. The chamber in each case is completed by the large corrugated plates 51 and 52. These plates, ends and pipes are welded or otherwise suitably secured together. The plates 51, 52 are similarly corrugated and are positioned so that the horizontal distance between them is the same from point to point. The end members 49 and 50 may be made up in different ways, but preferably I employ a series of corrugated strips, shown perhaps most clearly in Fig. 2, and weld or braze these strips together so as to build up the end member 49 or 50, as the case may be.

In the operation of the one high apparatus, the liquid to be treated is supplied through the pipes 18 and passes down over the plates 51, 52 of the units B and from them into the basin or of the units B from which it is delivered through the trough D from which it is delivered through the connection 23. While the liquid being treated is thus flowing, the temperature modifying medium is supplied through pipe 29 and the connections of post 25 to the lower pipe 44 of the treating unit and thence it passes through the chamber of the unit, the pipe 43, and the pivot block connections to pipe 35. Preferably, the treated liquid passes downward while the treating fluid passes upward, although of course this order need not be carried out in every case, as in some instances it might be desirable to have the two travel downward.

It will be seen that by reason of the pivotal connections each unit B may be rotated about its axis of rotation through the center of rod 42 much as the leaves of a book are moved from closed to open position and vice versa. This is of importance when it is desired to clean the units after service. In service they are positioned directly below the pipes of the supply connections C. When being washed, they are pulled apart as indicated by the dotted line positions of these units in Fig. 4.

In order to hold the units B in proper position for operation any suitable catch device may be employed. In the present instance I have shown upon each unit a pivoted lever 53 which has one end arranged to bear against the under side of the associated pipe 18 to hold the unit in proper position. When it is desired to release the unit, it is only necessary to lift up on the hand-hold end of the lever. This action will free the engaging end.

The frame $A^1$, the frame of the two-high apparatus, is similar to the frame A but higher, in order to accommodate the two sets of treating units. At the top its long legs 60 are connected together by the same arrangement of bars 11, 12, 13, 14, 15, as in the case of frame A; likewise at the bottom the bars 16, 17 and the frame 24 cooperate in the same way as in the case of frame A. The supply connections $C^1$ are the same as the connections C but are located at a greater height from the floor 27 by reason of the higher frame $A^1$. Similarly, the lowermost basin or trough $D^1$ of the two-high apparatus is supported and arranged in frame $A^1$, the same as the trough D is supported and arranged in frame A. Likewise the treating units $B^1$ and $B^2$ are the same as the units B but, of course, are arranged differently in frame $A^1$ than the units B were in frame A. Again, the upper pivot blocks 61 are the same as the pivot blocks 26, and their connections are the same although the pipes are a little longer to suit the change in frame size. These new connections comprise pipes 62, 63, and elbows 64, one set being employed for each pivot block. The lowermost pivot blocks 65 are practically the same as the corresponding blocks 25. Their connections include the various supply pipes 29 which enter the pivot blocks from beneath.

The intermediate pivot blocks 66 are in a sense combinations of the upper blocks 61 and the lower blocks 65, for each block 66 has means for accomplishing the same results as the two blocks 61 and 65. In each instance the block 66 has an upper central bore 67 and a lower central bore 68. These are in line with each other but are separated by a portion of the material of the block. The pivot pipes 30 of the upper units $B^1$ fit into and are rotatable within the upper bores 67, while the pivot pipes 37 of the lower units $B^2$ fit into and are rotatable within the bores 68. The arrangement shown provides a possible rotation for each set of vertically associated units $B^1$, $B^2$, about the same vertical axis, that axis being in each instance coincident with the axes of the rods 42 of the associated upper and lower units. In this unit construction lateral pipe connections communicate with the bores 67 and 68 respectively. The former include in each instance pipes 69, 70, and an elbow 71, and the latter pipes 72, 73, and an elbow 74.

The intermediate trough and distributor $C^2$ comprises in the instance illustrated three compartments 76. These compartments are of such size and are so located that they will catch and distribute all of the liquid which is delivered from the treating units directly above them, that is to say, the first compartment 76 will receive liquid from the first unit $B^1$, the second compartment from the second unit $B^1$, etc. In like manner, the first compartment will deliver the liquid to the first unit $B^2$, the second compartment to the second unit $B^2$, etc. The intermediate trough $C^2$ may be variously formed and held in position in the frame $A^1$. A good construction, however, is that illustrated. There, the trough is a unitary structure formed with the necessary compartments. In each case the compartment is long enough and wide enough to catch all the liquid which is to be delivered to it from the unit $B^1$ directly above it. A series of holes 77 in the bottom of each compartment provides for distributing the collected liquid to the unit $B^2$ directly beneath the compartment. The complete trough $C^2$ has much the same construction as the other troughs and, like them, is provided with a peripheral flange, designated 78, which rests upon a frame 79 which extends around beneath the peripheral flange, or at least beneath a substantial portion of it. The frame 79 is preferably made of channel irons, and at its various points of contact it is secured to the frame members 16 or the posts 60 by welding or otherwise.

In the operation of the two-high apparatus, the liquid to be treated will ordinarily be supplied through the pipe connections $C^1$ and delivered through the openings 20 of these connections to the upper edges of the associated units $B^1$. The liquid will then flow downward over the corrugated surfaces of these units and pass from their lower edges into the various compartments 76. From these compartments the liquid will pass through the holes 77 and be again supplied to the upper edges of the lower set of treating units $B^2$. From the latter the liquid will be collected by the basin or trough $D^1$ and passed out through the connection 23 to a storage tank or other container. At the time the liquid to be treated is being passed over the treating units $B^1$ and $B^2$ in the manner described, these units will be supplied with a treating fluid. Ordinarily, the upper units $B^1$ will receive the treating fluid through the pipes 70 and their connections and deliver the fluid through the pipes 63 and their connections. As before indicated, this direction of flow might in some instances be reversed. In like manner the lower units $B^2$ will receive their supply of fluid through the pipes 29 and discharge through the pipes 73 and their connections. Again, this direction of flow may in some instances be reversed to advantage.

As an illustration of a use of the two-high apparatus, it may be pointed out that the same can be used to advantage in pasteurizing milk. In such case, the milk is flowed down over the surfaces of the units $B^1$ and $B^2$ in succession, just as before described. At the same time the treating fluid supplied to the upper units $B^1$ would be a fluid which would heat the milk. Steam might be used for this purpose. By passing the steam through the units quickly, a very high temperature can be imparted to the descending stream of milk. This would be enough to properly pasteurize it and present it in pasteurized condition to the intermediate container $C^2$. From this point on the milk in passing over the lower units $B^2$ is cooled. This change in treatment is caused by supplying a cooling fluid to the lower units through the pipes 29 and 73. Such cooling fluid might be brine or ammonia. Obviously, with the one-high apparatus the heating of the milk may be accomplished in the same way as just described in connection with the unit $B^1$. From such a heating unit, or set of units, the milk may then be passed through pipes or otherwise to a second like one-high apparatus which would by its treating units quickly cool the pasteurized milk.

In addition to pasteurizing and sterilizing milk, it would also be possible to construct the apparatus with the corrugated sheets of the units close enough together to stassanize the milk. The stassanizing process is described at length in United States Patent No. 1,790,117, granted January 27, 1931, and British Patent No. 254,725, accepted February 17, 1927, and it is referred to as such and described in various publications, such as, Statens Forsogsmejeri, Hillerod, Denmark, November 1926, printed by Emil Stechers, Bogtrykkeri, Silkeborg, Denmark; Le Lait, Impremeries Reunies, March 1930, 3, rue Lamartine, Lyon, France; and Le Lait, Revue Generale des Questions Laiteries, 3, Quai Chauveux, Lyon, France. In some instances of use of the apparatus, it might be desirable to interchange the treating fluid and the fluid to be treated and pass the former from supply connections over the units, and the latter through the units. The possibility of using the apparatus in this way shows the field to which the novel structure I have devised may be applied. It, therefore, follows that in considering the appended claims the structure should be considered with this interchangeability in function in mind.

It will also be noted that what I have generally termed a "unit" may be, and commonly is, called a "section". As a result some of the appended claims contain one term and some the other. This is the outcome largely of the suggestion of claims from an interfering application of another party.

Obviously, in the cleaning of the units, it is not necessary to move all of the units. Thus, the last one may be left unmoved. Swinging away the adjacent units will leave it accessible for cleaning.

In view of the possible variations that may be practiced by the user and the possible variations that may be made in the structure shown without departing from the spirit and scope of the invention, reliance must be had upon the terms of the appended claims to cover these variations.

Likewise it should be noted that the medium supply connections of the movable units remain intact at all times. They need not be mechanically broken apart or mechanically separated in order to free the units for movement from one angular position to another. The units are always movable relatively without rupturing the medium supply connections.

I claim:

1. A liquid treating apparatus comprising a temperature modifying unit, supply means fixed above the normal position of said unit for delivering the liquid to be treated by said unit, and fixed collecting means beneath the normal position of said unit for collecting the treated liquid; said unit comprising large corrugated metal sheets providing the main surfaces over which the liquid passes on its way from said supply means to said collecting means, end closing members for the chamber provided between said sheets, horizontal pipes forming the upper and lower closing members of said chamber and extending outward beyond one end of said assembled corrugated sheets, said pipes having holes communicating with said chamber, vertically bored and aligned bearing blocks above and below the projecting ends of said upper and lower pipes, intake and outlet pipes mechanically connected to said bearing blocks and communicating with their respective bores, a lower pivot pipe journaled in the top of said lower bearing block and communicating with its bore, an upper pivot pipe journaled in the bottom of said upper bearing block and communicating with its bore, said pipes being vertically aligned, and a gland and packing around each of said pivot pipes for providing a water-tight connection between the same and the block, said pivot pipes being free to rotate in their respective bearing blocks and being respectively in communication with the adjacent horizontal closing pipes, thus providing for the passage of the temperature modifying liquid into said chamber through one pivot pipe and out of said chamber through the other pivot pipe.

2. A liquid treating apparatus comprising a temperature modifying unit, supply means fixed above the normal position of said unit for delivering the liquid to be treated by said unit, and fixed collecting means beneath the normal position of said unit for collecting the treated liquid; said unit comprising large corrugated metal sheets providing the main surfaces over which the liquid passes on its way from said supply means to said collecting means, packs of relatively narrow corrugated strips of uniform width secured face to face in contact with each other throughout their width and length and thus forming sinous laminated compact end members fitting said corrugated plates and lying between them with their outer strips secured thereto face to face, said members forming closing means for the ends of the chamber formed by the spaced sheets, horizontal pipes forming the upper and lower closing members of said chamber and extending outward beyond one end of said assembled corrugated sheets, said pipes having holes communicating with said chamber, vertically bored and aligned bearing blocks above and below the projecting ends of said upper and lower horizontally extending pipes, intake and outlet pipes mechanically connected to said bearing blocks and communicating with their respective bores, a lower pivot pipe journaled in the top of said lower bearing block and communicating with its bore, an upper pivot pipe journaled in the bottom of said upper bearing block and communicating with its bore, said pipes being vertically aligned, and a gland and packing around each of said pivot pipes for providing a water-tight connection between the same and the block, said pivot pipes being free to rotate in their respective bearing blocks and being respectively in communication with the adjacent horizontal closing pipes, thus providing for the passage of the temperature modifying liquid into said chamber through one pivot pipe and out of said chamber through the other pivot pipe.

3. A liquid treating apparatus comprising a plurality of temperature modifying units of relatively large height and width and small thickness pivoted to rotate about closely positioned vertical axes, supply means fixed above the normal position of said units for delivering the liquid to be treated by said units, and fixed collecting means beneath the normal position of said units for collecting the treated liquid; each of said units comprising large corrugated metal sheets providing the main surfaces over which the liquid passes on its way from said supply means to said collecting means, end closing members for the chamber provided between said sheets, horizontal pipes forming the upper and lower closing members of said chamber and extending outward beyond one end of said assembled corrugated sheets, said pipes having holes communicating with said chamber, vertically bored and aligned bearing blocks above and below the projecting ends of said upper and lower pipes, intake and outlet pipes mechanically connected to said bearing blocks and communicating with their respective bores, a lower pivot pipe journaled in the top of said lower bearing block and communicating with its bore, an upper pivot pipe journaled in the bottom of said upper bearing block and communicating with its bore, said pipes being vertically aligned, and a gland and packing around each of said pivot pipes for providing a water-tight connection between the same and the block, said pivot pipes being free to rotate in their respective bearing blocks and being respectively in communication with the adjacent horizontal closing pipes, thus providing for the passage of the temperature modifying liquid into said chamber through one pivot pipe and out of said chamber through the other pivot pipe.

4. A liquid treating apparatus comprising a plurality of temperature modifying units of relatively large height and width and small thickness pivoted to rotate about closely positioned vertical axes, supply means located above said units when in normal position for delivering the liquid to be treated to said units, and collecting means located beneath said units when in normal position for collecting the treated liquid; each of said units comprising large corrugated metal sheets providing the main surfaces over which the liquid passes on its way from said supply means to said collecting means, packs of relatively narrow corrugated strips of uniform width secured face to face in contact with each other throughout their width and length and thus forming sinuous laminated compact end members fitting said corrugated plates and lying between them with their outer strips secured thereto face to face, said members forming closing means for the ends of the chamber formed by the spaced sheets, horizontal pipes forming the upper and lower closing members of said chamber and extending outward beyond one end of said assembled corrugated sheets, said pipes having holes communicating with said chamber, vertically bored and aligned bearing blocks above and below the projecting ends of said upper and lower horizontally extending pipes, intake and outlet pipes mechanically connected to said bearing blocks and communicating with their respective bores, a lower pivot pipe journaled in the top of said lower bearing block and communicating with its bore, an upper pivot pipe journaled in the bottom of said upper bearing block and communicating with its bore, said pipes being vertically aligned, and a gland and packing around each of said pivot pipes for providing a water-tight connection between the same and the block, said pivot pipes being free to rotate in their respective bearing blocks and being respectively in communication with the adjacent horizontal closing pipes, thus providing for the passage of the temperature modifying liquid into said chamber through one pivot pipe and out of said chamber through the other pivot pipe.

5. A heat exchanger for liquids such as milk comprising a plurality of sections hinged at corresponding ends of the several sections to swing laterally relatively to one another away from operative positions in which they stand close together side by side to positions in which the sections are accessible for cleaning, means for supplying a heat exchange medium to the several sections and operable to permit said swinging movements of said sections, and means for delivering the liquid separately to said several sections when in their operative positions.

6. A heat exchanger for liquids such as milk comprising a plurality of sections hinged at corresponding ends of the several sections to swing laterally relatively to one another away from operative positions in which they stand close together side by side to positions in which the sections are accessible for cleaning, means for supplying a heat exchange medium to the several sections and operable to permit said swinging movement of said sections, means for delivering the liquid separately to said several sections when in their operative positions, the said sections being movable relatively to the liquid delivering means, and means for properly alining the sections in their operative positions relatively to said liquid delivery means.

7. A heat exchanger for liquids such as milk comprising a plurality of sections, means mounting said sections for movement laterally relatively to one another to and from operative positions in which they are arranged close together side by side, means for delivering liquid to said sections when in their operative positions, said sections being arranged in vertical groups each comprising a plurality of said sections disposed one above the other, the sections in each group being independently movable laterally, means for supplying a heat exchange medium to the corresponding sections of different vertical groups, and means for supplying a different heat exchange medium to other corresponding sections of different vertical groups.

8. A heat exchanger for liquids such as milk comprising a plurality of sections, means mounting said sections for movement laterally relative to one another to and from operative positions in which they are arranged close together side by side, means for delivering liquid to said sections when in their operative positions, said sections being arranged in vertical groups each comprising a plurality of said sections disposed one above the other, the sections in each group being independently movable laterally, means for supplying a heat exchange medium to the corresponding sections of different vertical groups, means for supplying a different heat exchange medium to other corresponding sections of different vertical groups, the said sections being independently mounted for such relative lateral movement and independently demountable.

9. A heat exchanger for liquids such as milk comprising a plurality of vertical groups of heat exchange sections arranged side by side and separable from one another by sidewise movement to render the sections accessible for cleaning, the sections in each vertical group being independently movable sidewise, and connections by which different heat exchange mediums are supplied to the different sections of the vertical groups.

10. A heat exchanger for liquids such as milk comprising a plurality of vertical groups of heat exchange sections arranged side by side and hinged to swing sidewise outwardly from said side by side positions to render the sections accessible for cleaning, the sections in each vertical group being independently movable sidewise, and connections by which different heat exchange mediums are supplied to the different sections of the vertical groups.

11. A heat exchanger for liquids comprising a frame, a first upright liquid treating section and other upright liquid treating sections, all of said sections being adapted to occupy operative positions in which they stand close together side by side and other positions in which they are individually accessible for cleaning, said first and other sections having in each instance an interior for receiving a liquid controlling medium and an exterior comprising surfaces on its opposite sides over which the liquid to be treated may pass in a downward course independently of engagement with other sections, means for securing said first section to said frame and supplying its interior with a liquid controlling medium, means for hinging said other sections to said frame and supplying a liquid controlling medium to their interiors, said hinging and supplying means providing, first, vertical axes of rotation for said other sections near corresponding vertical edges of all of said sections, one vertical axis of rotation for each said other section, and, second, medium supply connections for said other sections for supplying said medium thereto when said other sections are in their operative positions, said connections being mechanically continuous for all positions of said other sections, whereby said sections may be made to occupy said operative and cleaning positions at will without disconnecting said medium supply connections, means near the tops of said sections when in their operative positions to deliver thereto the liquid to be treated, and means at the bottoms of said sections when in their operative positions to receive therefrom the treated liquid 12. A heat exchanger for liquids comprising a frame, a first upright liquid treating section and other upright liquid treating sections, all of said sections being adapted to occupy operative positions in which they stand close together side by side and other positions in which they are individually accessible for cleaning, said first and other sections having in each instance an interior for receiving a liquid controlling medium and an exterior comprising surfaces on its opposite sides over which the liquid to be treated may pass in a downward course independently of engagement with other sections, means for securing said first section to said frame and supplying its interior with a liquid controlling medium, swiveled hollow hinges for hinging said other sections to said frame, conduit connections for supplying a liquid controlling medium through said hinges to the interiors of said other sections, said hinges and conduit connections being located at corresponding ends of said sections and providing vertical axes of rotation for said other sections and medium supply connections for said other sections, which connections remain mechanically unbroken in all angular positions of said sections, whereby said sections may be made to occupy said operative and cleaning positions at will without disconnecting said medium supply connections, means near the tops of said sections when in their operative positions to deliver thereto the liquid to be treated, and means at the bottoms of said sections when in their operative positions to receive therefrom the treated liquid.

13. A heat exchanger for liquids comprising a frame, upper and lower groups of upright treating sections, the sections of each group comprising a first section and other sections, all of said sections of each group being adapted to occupy operative positions in which they stand close together side by side and other positions in which they are individually accessible for cleaning, all of the sections of said groups having in each instance an interior for receiving a liquid controlling medium and an exterior comprising surfaces on its opposite sides over which the liquid to be treated may pass in a downward course independently of engagement with other laterally adjacent sections, means for securing the first section of each group to said frame and supplying its interior with a liquid controlling medium, means for hinging the said other sections of each group to said frame and supplying their interiors with a liquid controlling medium, said hinging and supplying means being located in the case of each group at corresponding ends of the said other sections of that group and providing vertical axes of rotation adjacent said ends and medium supply connections for all said other sections of the group, which connections remain unbroken in all angular positions of said other sections, whereby the sections of each group may be made to occupy said operative and cleaning positions without disconnecting the medium supply connections, the corresponding sections of the upper and lower groups being in substantial alignment when in their operative positions, means near the tops of the sections of the upper group when in their operative positions to deliver thereto the liquid to be treated, means at the bottoms of said upper sections and at the tops of said lower sections when both said upper and lower sections are in their operative positions, to receive the liquid after leaving the upper sections and to distribute the same to the lower sections, and means at the bottoms of said lower sections for receiving therefrom the liquid as it passes off of said lower sections.

JULIUS J. MOJONNIER.